(No Model.)
F. M. THOMPSON.
DEVICE FOR SEPARATING WHITES AND YOLKS OF EGGS.
No. 595,255. Patented Dec. 7, 1897.
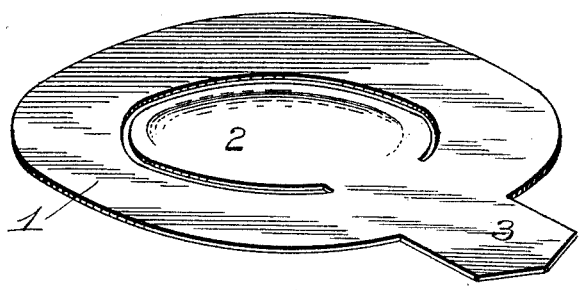
Fig. 1.
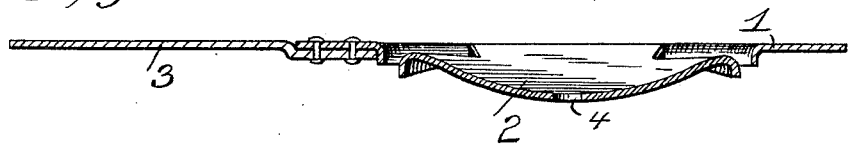
Fig. 3.
Fig. 2.
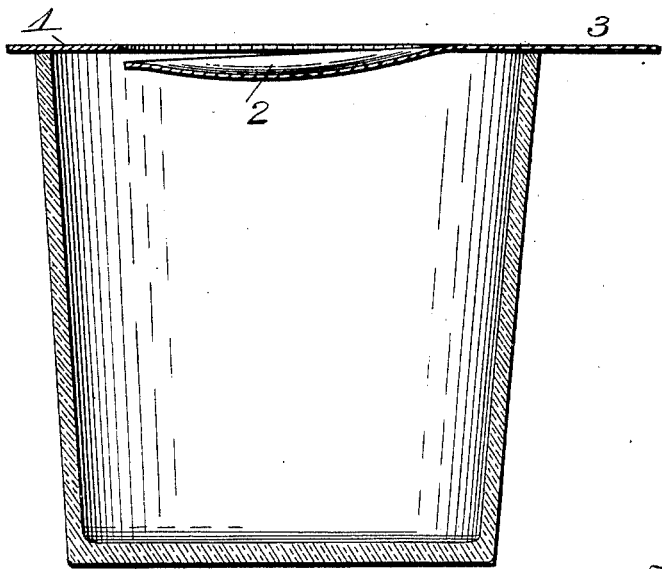
Witnesses:
Franck L. Ourand.
Jo. L. Coombs
Inventor:
Frederick M. Thompson
by Louis Baggen & Co.
Attorneys.

United States Patent Office.

FREDERICK M. THOMPSON, OF JACKSON, MICHIGAN, ASSIGNOR TO GEORGE S. WILSON, OF SAME PLACE.

DEVICE FOR SEPARATING WHITES AND YOLKS OF EGGS.

SPECIFICATION forming part of Letters Patent No. 595,255, dated December 7, 1897.

Application filed June 7, 1897. Serial No. 639,746. (No model.)

*To all whom it may concern:*

Be it known that I, FREDERICK M. THOMPSON, a citizen of the United States, and a resident of Jackson, in the county of Jackson and State of Michigan, have invented certain new and useful Improvements in Devices for Separating the Whites and Yolks of Eggs; and I do hereby declare that the following is a full, clear, and exact description of the invention, which will enable others skilled in the art to which it appertains to make and use the same, reference being had to the accompanying drawings, which form a part of this specification.

My invention relates to an improved device for separating the yolks from the whites of eggs; and it consists, essentially, in a ring, preferably made of metal, having a central concave plate connected with said ring with an integral strip and bent slightly downward so as to extend below the ring, the construction being such that when an egg is broken and dropped upon said plate the white of the same will escape through the space or opening between it and said ring and fall into a tumbler or other similar object upon which the device is placed, while the yolk will remain upon the plate, as hereinafter fully described and claimed.

In the accompanying drawings, Figure 1 is a perspective view of an egg-separating device constructed in accordance with my invention. Fig. 2 is a longitudinal sectional view of the same, showing it resting upon a tumbler ready for use. Fig. 3 is a horizontal section of the device, showing a slightly-modified construction.

In the said drawings the reference-numeral 1 designates an outer metal ring or plate having formed integral therewith an inner circular concave plate 2, with a space therebetween extending almost entirely around the plate. Said concave plate is bent down slightly below the under side of the ring. Also formed with said ring is a pointed handle 3 for manipulating the device, the point of which is adapted to break the egg-shell.

I prefer to construct the device out of sheet-metal stamped into the proper shape.

In use the device is placed upon a tumbler and an egg broken and the yolk and white dropped onto the concave plate. The white will now drain through the space or opening into the tumbler, leaving the yolk on the plate. The yolk can then be slid off the device into any suitable receptacle. The pointed handle, as before stated, can be used to break the egg-shell.

In the modification shown in Fig. 3 I have shown the edges of the concave plate 2 and the ring as turned down at an angle and the plate formed with a central hole 4 for facilitating the separation of the whites from the yolks. In this modification also the handle is made separate from the ring and secured thereto by rivets or other means.

Having thus fully described my invention, what I claim is—

1. As an improved article, a device for separating the whites and yolks of eggs, consisting of the outer flat plate or disk, and the inner downwardly-extending concave plate inclined at an angle to said flat ring or plate and connected therewith by an integral strip, substantially as described.

2. As an improved article, a device for separating the whites and yolks of eggs, consisting of the flat plate or disk, the inner downwardly-inclined concave plate connected therewith by an integral strip, and formed with a central hole, and the pointed handle formed integral with said outer plate, substantially as described.

In testimony that I claim the foregoing as my own I have hereunto affixed my signature in presence of two witnesses.

FREDERICK M. THOMPSON.

Witnesses:
GIFFORD PATCH,
ARTHUR M. BAKER.